United States Patent [19]

Malléner

[11] Patent Number: 4,756,869
[45] Date of Patent: Jul. 12, 1988

[54] METHOD OF STORING SPENT NUCLEAR FUEL ELEMENTS

[75] Inventor: Werner Malléner, Düsseldorf, Fed. Rep. of Germany

[73] Assignee: Kernforschungsanlage Julich GmbH, Julich, Fed. Rep. of Germany

[21] Appl. No.: 840,426

[22] Filed: Mar. 17, 1986

Related U.S. Application Data

[62] Division of Ser. No. 679,461, Dec. 7, 1984.

[30] Foreign Application Priority Data

Dec. 9, 1983 [DE] Fed. Rep. of Germany ....... 3344525

[51] Int. Cl.⁴ .............................................. G21C 19/00
[52] U.S. Cl. .................... 376/261; 376/264; 376/272; 376/904; 376/287
[58] Field of Search ............... 376/261, 264, 902, 272, 376/266, 267, 269, 339, 419, 214, 287; 252/626

[56] References Cited

U.S. PATENT DOCUMENTS

| 3,993,579 | 11/1976 | Bunnell et al. | 252/626 |
| 4,257,912 | 3/1981 | Fleischer et al. | 252/626 |
| 4,592,192 | 6/1986 | Jacob et al. | 252/626 |

FOREIGN PATENT DOCUMENTS

| 1186957 | 2/1965 | Fed. Rep. of Germany | 376/264 |
| 3995 | 1/1977 | Japan | 376/902 |
| 17495 | 8/1979 | Japan | 376/902 |

Primary Examiner—Deborah L. Kyle
Assistant Examiner—Richard W. Wendtland
Attorney, Agent, or Firm—Karl F. Ross; Herbert Dubno

[57] ABSTRACT

For safety in storage and transport of nuclear fuel elements outside a nuclear reactor core, they are provided with a coating of a neutron-absorbing substance from a liquid phase, e.g. by immersion, spraying or pouring, utilizing a melt, a solution or immersion so that the possibility of critical mass attainment is eliminated or minimized.

1 Claim, 1 Drawing Sheet

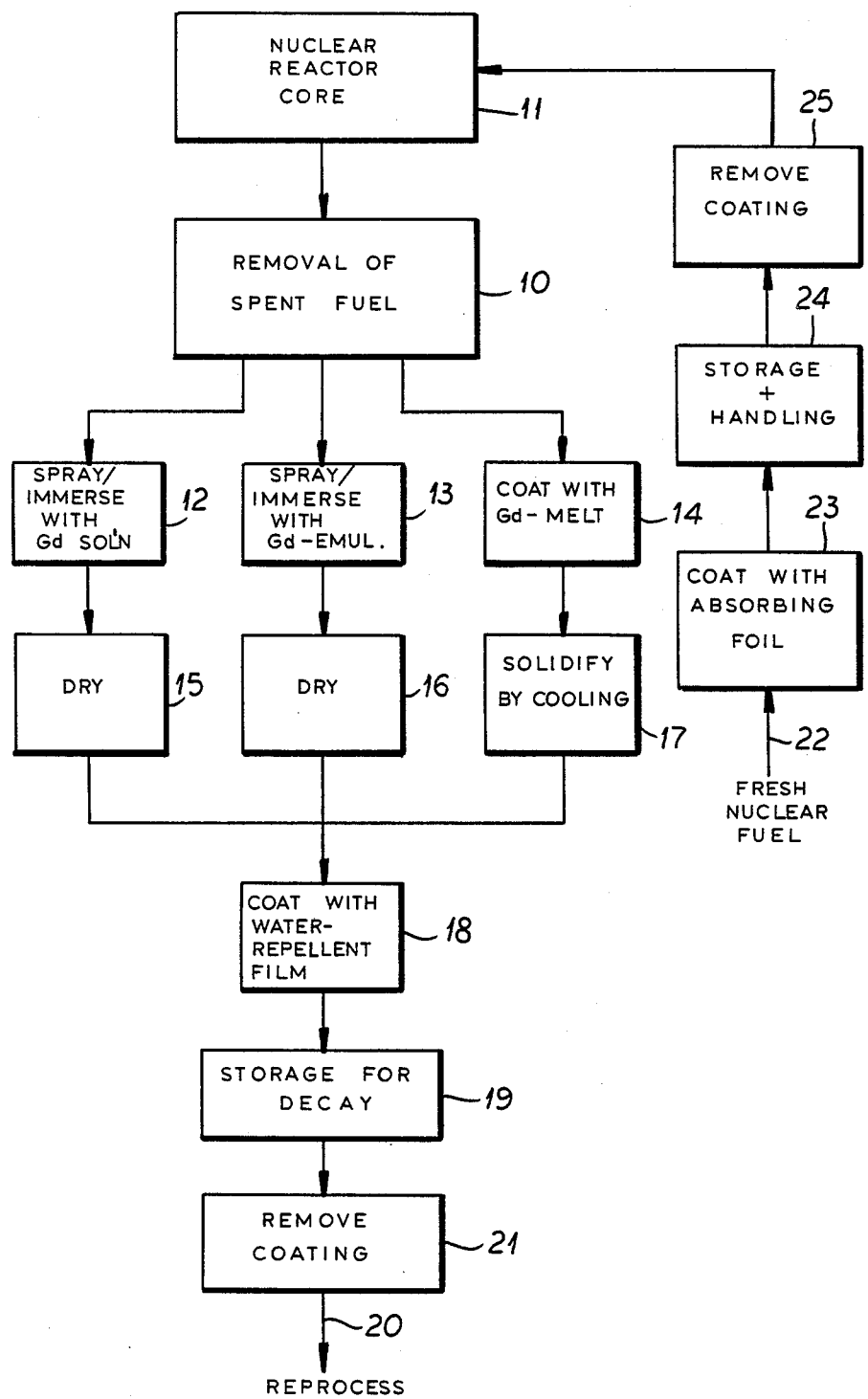

METHOD OF STORING SPENT NUCLEAR FUEL ELEMENTS

CROSS REFERENCE TO RELATED APPLICATIONS

This application is a division of 06/679,461 filed Dec. 7, 1984 and relates to the commonly assigned copending applications Ser. Nos. 656,989 and 657,332, both filed Oct. 3, 1984. Ser. No. 06/657,332 has been replaced by Ser. No. 06/902,006 filed Aug. 27, 1986 and is now abandoned.

FIELD OF THE INVENTION

My present invention relates to a method of storing spent fuel elements and, more particularly, burned out nuclear fuel elements which have been removed from a nuclear reactor core.

More specifically the invention deals with nuclear fuel elements, especially particles, balls or the like containing graphite or carbon coatings or bodies and which retain residual radioactive activity and must be stored at least temporarily, e.g. for at least a certain degree of decay of the activity.

BACKGROUND OF THE INVENTION

The term "nuclear fuel element" as used herein is intended to refer primarily to graphite or carbon-containing or coated bodies which contain nuclear fuel materials which have at least partly undergone a fission reaction, although the invention may be applicable to other nuclear fuel bodies or elements as well. Generally the invention is intended to apply to spent fuel elements, i.e. fuel elements which have been removed from a nuclear reactor core because at least part of fissionable material contained therein has undergone the fission reactor.

It is known that nuclear fuel elements containing fissionable fuel materials undergo during their period within the reactor core only a relatively small amount of decay, fission or consumption, i.e. only a small amount of the potentially fissionable material participates in the fission reaction.

During the fission reaction, fission products are formed which are considered neutron poisons, i.e. reduce the neutron generation capability or reactivity of the fuel element. When the activity of the fuel element is diminished to a certain degree, it is common practice to remove the fuel elements and replace them by fresh fuel, the removed fuel elements being referred to as a spent fuel.

In general, only about 3 to 4% by weight of the potentially fissionable material in the fuel element can be considered to be consumed before the fuel element is deemed to be spent. The greater part of the fissionable fuel remains unreacted and thus unused so that it can be recovered by nuclear fuel processing procedures well known in the art.

Because of the high level of reactivity, spent fuel elements after removal from the reactor core are stored in radiation-shielding storage vessels to allow radioactivity to decay sufficiently to permit reprocessing. The storage must be effected under conditions such that subcriticality is not reached in the storage vessel, i.e. under conditions such that the self-sustaining chain reaction which results from criticality does not occur. This is achieved by an appropriate geometric arrangement of the fuel elements.

The storage vessels for this type of activity-reducing decay of spent fuel elements just removed from a nuclear reactor is generally effected within the nuclear reactor installation itself.

After a satisfactory degree of decay, the spent fuel elements are amenable to reprocessing which is generally effected at a facility other than the nuclear reactor and may be transported and stored in appropriate transport receptacles. Naturally, during transport, care must be taken to avoid any release of the radioactive material into the environment by accident or otherwise.

The initial decay storage of the spent nuclear fuel elements upon their removal from the reactor core generally utilized water tanks into which the nuclear fuel elements were dumped or lowered with appropriate care so that criticality would not be reached.

For both the initial decay period and for subsequent storage and transport, however, there remains the need for a technique which will prevent or diminish the dangers represented by the activity of spent nuclear fuel elements, both with respect to reaching criticality and with respect to release of radioactivity into the environment.

OBJECTS OF THE INVENTION

It is, therefore, the principal object of the present invention to provide an improved method of storing spent nuclear fuel elements which is capable of inhibiting the attainment of criticality and also reduces the danger of release of radioactivity into the environment under normal conditions and in the case of accidents involving spent nuclear fuel.

Yet another object of the invention is to provide an improved method of protecting against the dangers of error in storage of nuclear fuel elements so as to preclude criticality even where a critical mass of the fuel elements has accidentally been accumulated in a geometry which otherwise would cause a self-sustaining chain reaction.

It is also an object of this invention to provide a simple and economical way of reducing the hazards of spent nuclear fuel elements.

SUMMARY OF THE INVENTION

These objects are attained, in accordance with the invention, in a method of storing spent nuclear fuel elements from a nuclear reactor core in which the spent nuclear fuel elements are brought into contact at least over their surfaces, upon removal from the core, with a flowable neutron-absorbing substance capable of coating and depositing on the fuel elements and remaining adherent thereto for at least a period of storage which can include transport.

More particularly, the neutron-absorbing substance is in the form of a solution, emulsion or melt and is applied to the nuclear fuel elements by immersing the fuel elements in this substance and/or by spraying or pouring this flowable substance onto the nuclear fuel elements.

Specifically, the spent fuel elements are immersed, sprayed or coated by pouring of the substance which is in the form of the solution, emulsion or melt and which remains adherent to at least the surfaces of the fuel elements which are uniformly coated with this substance. The neutron-absorbing coating inhibits attainment of criticality no matter how the fuel elements are assembled or stacked. The quantity of the coating substance which is applied can be controlled easily by regulating the concentration of the substance in the solution or emuslion or melt and by the treatment time for the fuel elements, i.e. the immersion time, the duration of spraying.

An important advantage of the invention is that even in the case of an accident in the storage vessel containing the solution, emulsion or melt, no problem with respect to criticality results with the fuel elements because the adhesion of this substance to the surfaces of the fuel elements is such that the neutron absorption precludes attainment of critical mass.

According to another feature of the invention, the fuel elements are recovered, after coating with the substance in flowable form and dried in the case of a treatment with a solution or emulsion or subjected to hardening of the melt coating. The dried fuel elements can then be additionally provided with a water-repellent coating. Alternatively, the melt can provide the water-repellent coating directly.

A preferred coating material is a solution of gadolinium acetyl acetonate solution.

When the nuclear fuel elements are graphitic nuclear fuel elements, they are immersed preferably in a gadolinium acetate solution in the best mode embodiment of the invention. The gadolinium acetate solution can be applied at its boiling point, thus promoting the penetration of the solution into the graphite of the nuclear fuel elements and upon draining of the solution and cooling, the coated fuel particles are recovered substantially in a dry state. They can then be coated with a thin synthetic resin sheet or layer. Alternatively or in addition, a plastic foil or film can be applied in emulsion or melt form and can contain the gadolinium acetyl acetonate.

In the cases described, an extremely adherent neutron-absorbent coating or layer is applied to or formed on at least the surface of each nuclear fuel element to minimize neutron release beyond the fuel element.

The invention has been found to be especially applicable to graphite fuel elements, i.e. nuclear fuel balls or particles in which graphite encases the uranium or thorium nuclear fuel. Such fuel elements are shown or described in the aforementioned copending applications which apply to operations occuring within a nuclear reactor.

Upon immersion of these elements or spraying them with the neutron-absorbing substance or pouring the neutron-absorbing substance over them, the neutron-absorbing substance does not merely adhere to the surfaces, but penetrates into the pores of the graphite and fills these pores after drying of the solution or emulsion or after solidification of the melt. The fact that the neutron-absorbing substance is penetrated more or less deeply into the nuclear fuel element not only improves the safety during storage but also represents an improvement during transport and in the case of accident since even a traumatic disruption of surface films will not eliminate the neutron-absorbing effect of the portion of the substance which has penetrated into the graphite.

The water-repellent coating which is applied serves to prevent washing off of the coating and can be in the form of a lacquer such as shellac, a resin, a plastic, bitumen or even a nonwater-soluble gadolinium-containing composition.

Indeed, when gadolinium acetyl acetonate constitutes the substance, it is found to be relatively refractory after drying to sprays of water or the like which one might normally expect could wash off the substance.

Nuclear fuel elements of the type having discrete nuclear fuel units embedded in the graphite body can be in turn immersed in an aqueous gadolinium acetate solution. Here again penetration is promoted by maintaining the gadolinium acetate solution or bath at the boiling point and cooling the fuel elements after they are removed from the solution.

When synthetic resin foils are used to envelop the nuclear fuel elements, they can contain neutron-absorbing substances, the preferred member of this class being europium oxides, gadolinium oxides, cadmium oxides and mixtures or combinations thereof.

Depending upon the concentrations of these materials in the foils, the foil thickness is chosen to preclude attainment of criticality regardless of how the fuel elements are massed.

The foils are removed, e.g. by burning them off or dissolving them before the fuel elements are subjected to reprocessing.

I have found it to be advantageous, moreover, to provide such foils for even fresh nuclear fuel elements to prevent criticality during storage or handling, the foils being removed before these fuel elements are introduced into the nuclear reactor.

BRIEF DESCRIPTION OF THE DRAWING

The above and other objects, features and advantages of the present invention will bcome more readily apparent from the following description, reference being made to the accompanying drawing in which the sole FIGURE is a flow diagram illustrating the invention.

SPECIFIC DESCRIPTION

As can be seen from the drawing, after removal of spent nuclear fuel elements at 10 from a nuclear reactor core 11, the spent fuel is sprayed with a solution 22 or with an emulsion 13 or is immersed in either or is coated with a melt 14 containing gadolinium or some other substance with a high neutron cross section to form an absorbent coating which is dried at 15 and 16 or solidified by cooling as shown at 17. The coated spent fuel particles are then further coated with a water-repellent film 18 before they are subjected to storage at 19 for decay.

After the desired storage term and before reprocessing at 20, the coating is removed at 21.

Fresh nuclear fuel is shown at 22 can also be coated with a foil, this time containing the absorbing substance as shown at 23 and thus can be stored and handled at 24 without the danger of reaching criticality. Before the fresh fuel is introduced into the nuclear reactor, however, the coating is removed at 25.

SPECIFIC EXAMPLES

Example 1

Spent metal sheathed nuclear fuel elements are removed from the nuclear reactor core into a tank containing cooling water in the form of a solution of gadolinium nitrate and gadolinium chloride although other water soluble gadolinium salts or water-soluble salts of other neutron-absorbing elements can also be used. The solution concentrations can be such that the neutron-absorbing substance is present in an amount between substantially 0.5% to the solubility limit of the water-soluble salt of the absorbing substance. Deposition of gadolinum on the metallic shell, effected galvanically by polarizing the metal shell negatively, i.e. as a cathode against an inert (e.g. stainless steel) anode and applying a low-voltage direct current, e.g. about 24 volts. Depending upon the activity of the nuclear fuel, coating was continued to build up thicknesses sufficient to reduce the neutron emission below any level which can sustain criticality.

Example 2

Spent nuclear fuel elements are coated by spraying or dipping in a single component or multicomponent lacquer, preferably an epoxy resin lacquer in which gadolinium oxide powder is dispersed in the lacquer. The lacquer is permitted to set or solidify.

Example 3

The fuel elements are coated by gadolinium acetyl acetonate by immersing them in a melt of this substance or in an aqueous solution thereof or by spraying them with this solution or pouring this solution over them. Upon drying of the coating, the fuel elements are found to be water repellent and incapable of assembling into a critical mass.

Example 4

Spent graphitic fuel elements are introduced into a melt of gadolinium acetyl acetonate and are stored in a solution of the melt at least until gases begin to be driven off. The gases appear to be air which is expelled by heat from the pores to promote penetration of the melt and the solution so that these graphite pores are penetrated and at least partially filled with flowable material.

After drying, electron microscopy, autoradiography and neutron activation analysis in the nuclear reactor shows a penetration of the neutron-absorbing substance into the deepest levels of the graphite fuel elements. The surface of the fuel elements were then immersed in hot saturated aqueous gadolinium acetate solution and then cooled and dried. They are found to be filled with gadolinium acetate crystallites.

When the graphitic fuel elements are heated to a temperature above aboaut 750° C. after this treatment, the gadolinium acetate is decomposed, leaving behind gadolinium oxide which is water insoluble and is immobile in the graphitic material even at high temperatures.

Gadolinium oxide thus becomes an integrated component of the spent fuel element and resists loss therefrom even with major traumatic insults to the fuel elements during accidents of transport or storage by the effects of water and heat and even upon rupture of the fuel elements.

Example 5

Comparative tests with Example 4 were made with graphitic fuel elements treated with aqueous gadolinium acetate at room temperature and atmospheric pressure. The amount of the neutron-absorbing substance taken up by the fuel element increased with the residence time of the fuel element in the solution.

Example 6

Nuclear fuel elements are coated with a synthetic resin foil. The foil is a polyvinyl chloride and is applied in a melt which contains as neutron-absorbing substance europium oxide. The concentrations of this material in the foil range from 0.5% to 25% by weight. Foil wraps of polyester, (Mylar) containing europium oxide as well as gadolinium and calcium oxide also were used effectively. Before introduction of the fuel element into the reactor or reprocessing, the foil was removed as previously described.

I claim:

1. A method of handling nuclear fuel elements which comprises the steps of:
    covering nuclear fuel elements with a thin synthetic resin layer containing at least one neutron-absorbing substance;
    handling and storing said nuclear fuel elements while they are covered with said thin layer;
    thereafter removing the thin layer from said elements; and
    thereafter introducing said nuclear fuel elements into a nuclear reactor core.

* * * * *